CREEL
8
Z
100
K
V
A
B
C
E
F
G
H
I
J
S
W
W'

VS
P

United States Patent Office

Re. 27,764
Reissued Oct. 2, 1973

27,764

SYSTEM FOR CONVERTING CONTINUOUS FILAMENT TOW INTO STAPLE SLIVER

Elbert F. Morrison, Rte. 1, Box 35, Clarksville, Va. 23927, and Raymond D. Joy, Rte. 3, Box 584, Madison, N.C. 27025

Original No. 3,522,634, dated Aug. 4, 1970, Ser. No. 686,141, Nov. 28, 1967. Application for reissue Oct. 3, 1972, Ser. No. 294,544

Int. Cl. D01g *1/00*

U.S. Cl. 19—.6 14 Claims

Matter enclosed in heavy brackets [ ] appears in the original patent but forms no part of this reissue specification; matter printed in italics indicates the additions made by reissue.

ABSTRACT OF THE DISCLOSURE

A textile system and process of converting continuous filament or length tow into staple lengths by cutting or fracturing the filaments to a predetermined length and continuously debonding the cut or fractured tow, straightening the turn back fibers, randomizing the staple fibers and removing waste such as mashed sections (fish food or the like) from the sliver. The system and process further contemplates drafting the randomized fibers to a homogeneous sliver of predetermined size.

The present invention is an improvement in systems and processes for converting continuous filament tow into sliver, and, more particularly, to a system and process for producing a homogenized sliver of predetermined size, the sliver having randomized staple fibers of a uniform predetermined length with little or no turn backs.

Heretofore, continuous filament tow has been converted into a staple sliver by apparatus known in the textile trade as the Pacific Converter. The continuous filament fibers were cut or fractured between a rotating anvil roll and a spiral or helical shaped cutter employing high pressures and then the fibers were further processed through a series of rolls for the purpose of debonding and drafting. Such a unit is disclosed in U.S. Pat. No. 2,438,469 granted Mar. 23, 1948, to Robert C. Wilkie and, while this apparatus was found useful in preparing sliver for many systems other than the worsted system for which it was originally designed, the advent of the newer synthetic fibers required further combing and carding before they could be spun into yarn. An early effort to accomplish the same on a converter is disclosed in U.S. Pat. 2,706,834 issued Apr. 26, 1955, to Robert C. Wilkie in which a rotary pin roll was utilized for combing with debonding and drafting being accomplished in a special shearing section comprising a moving apron cooperating with a series of rolls.

The present invention is an improvement over the apparatus and process disclosed in the latter mentioned Wilkie Pat. No. 2,706,834 in that the continuous filament or tow is fed to a pair of cutter and anvil roll members in at least two webs, each of the webs being cut or fractured on parallel lines extending obliquely of the direction of movement of the webs, the webs being superimposed on each other with their respective cut or fracture lines extending transversely so as to form a single web having a diamond-shaped cutting pattern in plan elevation. The single web is then subjected to a widthwise condensing and fed to the back rolls of a first gill station, through and from the first gill station to its front rolls. The draft between the back rolls and the faller bars of the first gill station is higher than the draft between these faller bars and the front rolls of the first gill station. The web is then further condensed in a widthwise direction and fed to the back rolls of a second gill station and from the second gill station through its front rolls. With regard to the second gill station, the draft between its back rolls and its faller bars is lower than the draft between its faller bars and the front rolls. From the second gill station, the web is fed through specially designed rolls for providing a further condensing operation just prior to coiling.

An object of the present invention is to provide an improved textile system and process for converting continuous filament tow into staple fibers of uniform length and then continuously debonding, straightening, and drawing the fibers so as to produce a homogeneous staple sliver of predetermined size, the staple fibers being thoroughly and uniformly randomized throughout the sliver.

Ancillary to the immediately preceding object it is a further object of the present invention to provide a system and process in which wool fibers or other Keratin type fibers can be blended into the back draft zones of either gill station giving a more homogeneous blend for better quality yarns.

Another object of the present invention is to provide an improved apparatus and process for cutting and/or fracturing continuous filament tow into staple fibers of uniform length and so arranging the cuts and/or fractures as to provide better shingling of the fibers during the continuous formation of the staple sliver.

Still another object of the present invention is to provide an improved system and process which effects better alignment and randomizing of staple fibers of uniform length throughout the resulting sliver and which results in a substantial reduction and elimination of turnback fibers.

A still further object of the present invention is to provide a system and process in which the tow being fed from creels or the like is fed at a controlled tension thereby insuring equal length cut and/or fractured fiber.

Still another object of the present invention is to provide an improved system and process in which two gill stations are arranged in-line thereby eliminating the necessity of crimping the produced sliver prior to coiling. Crimp staple fibers in sliver form has been found undesirable for good quality yarns due to the number of turn backs which remains in the sliver, the bruised fibers and the like resulting from production of sliver at normal converter speed.

A further object of the present invention is to provide an improved system and process in which there is a controlled widthwise condensing of the webs to condense the same to proper width and thickness just prior to each of the back drafting zones of the gill stations. Such condensing of the stock prevents the selvage of the sliver being formed from splitting.

Ancillary to the preceding object it is a further object of the present invention to provide means to compensate for the feather edges of the sliver caused by condensing of the sliver stock and the first gilling operation, the means utilizing at least one roll having a concave surface cooperating with a flat surface so as to distribute an equal amount of pressure across the width of the sliver. Such an arrangement eliminates the pulling out of clusters of fibers from the feather edges of the same without the same being drafted.

Still another object of the present invention is to provide an improved delivery of the finished sliver from the second or final gill station to a coiling apparatus, the improved delivery enabling the use of either a high or low coiling apparatus and delivery thereto without a problem of tension control.

These and other objects and advantages of the present invention will appear more fully in the following specification, claims and drawings in which:

Figure 4:
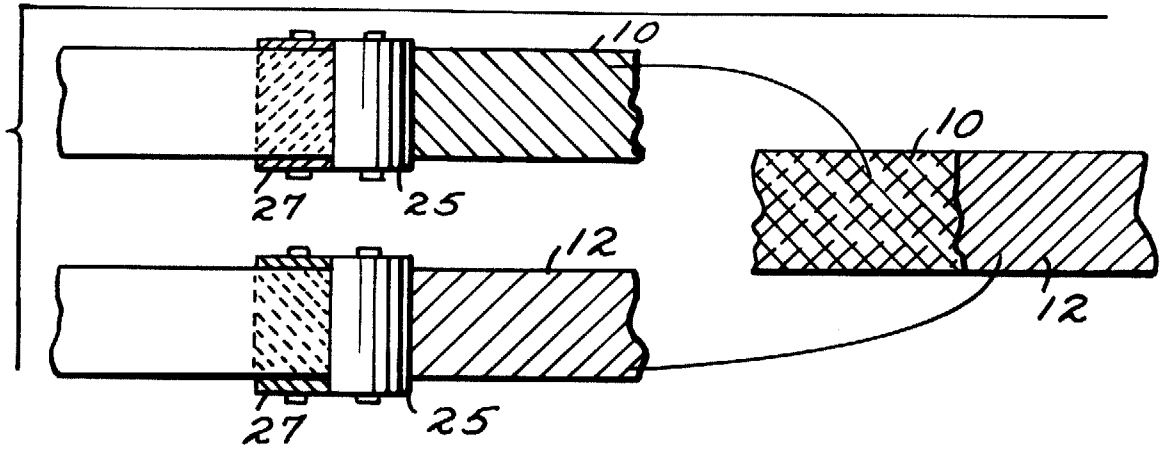
[FIG. 4 is a schematic view illustrating the cutting and/or fracturing of the continuous filaments of each of the webs and the arranging of the webs in superimposed relationship on each other so as to give a diamond-shaped cutting pattern in plan profile, and]

*FIG. 4 is a schematic view looking from above the apparatus in the direction of the arrow Z, the view illustrating the two vertically spaced cutter means offset transversely of one another to more clearly show the diagonal cuts of the individual webs and the view further illustrating the cut webs after they have been superimposed upon one another so as to give a diamond-shaped cut pattern in plan profile.*

Figure 5:
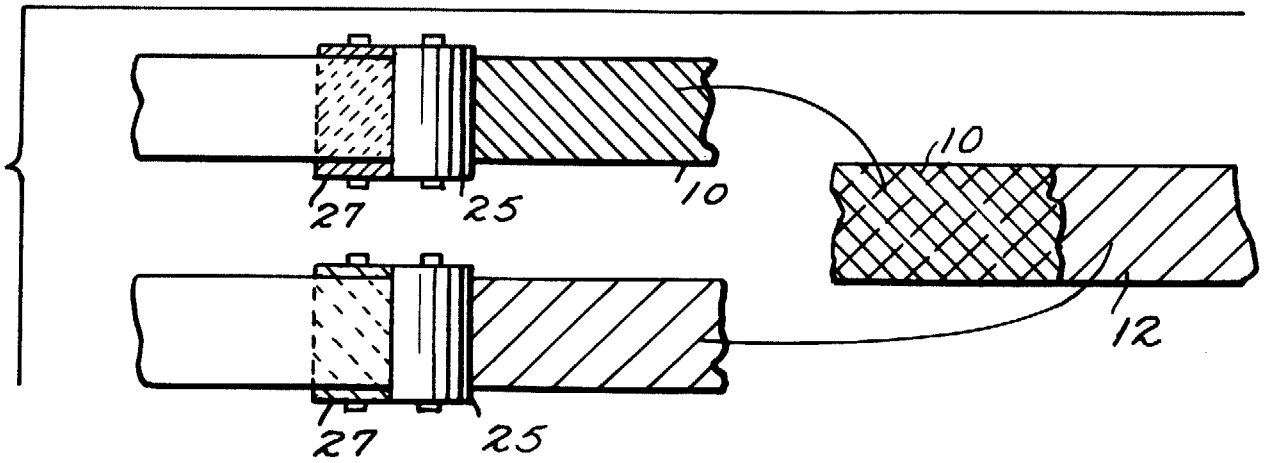

FIG. 5 is a schematic view *similar to FIG. 4 but* illustrating *a modified arrangement of* the cutting and/or fracturing of the continuous filaments of each of the webs and the arranging of the webs in superimposed relationship on each other so as to give a diamond-shaped cutting pattern in plan profile when the pitch of the land or lands of one cutter roll differ from the pitch of the land or lands of the other cutter roll.

Referring now to the drawings wherein like character or reference numerals represent like or similar parts, the system of the present invention is fed continuous filament tow from a creel or the like generally designated at 8, the tow being spread into at least two flat webs 10 and 12, the webs being fed through positively driven creel draw rolls 14 and 16. Each of the webs 10 and 12 are then threaded about suitable tension rolls 18 from which they feed to respective feed-in roll members 20 and 22. Feed-in roll members 20 and 22 are positively driven and are coupled to the creel draw rolls 14 and 16 by suitable linkage or the like. By a predetermined gearing or sprocket ratio, a desired tension can be placed on the webs 10 and 12 of the tow so that all crimp is removed from the individual filaments of the tow and so that the cutter means 24 and 26 will cut only equal length staples.

From the feed-in roll members the webs 10 and 12 respectively pass through cutter means 24 and 26 wherein each web is cut on parallel lines extending obliquely to the direction of movement of the webs. The webs 10 and 12 are then brought together in superimposed contiguous relationship in a stationary condensing station A where the width of the web is condensed to a predetermined size. Immediately upon traveling from the condensing station A, the superimposed webs, which will hereafter be identified as a single web W, pass into a first gilling station B having a back draft C which is higher than its front draft E. Upon leaving the first gilling station B, the single web W passes through a second stationary condensing station F where the width of the web is further condensed. When the web leaves the condensing station F, it immediately passes through a second or final gill station G having a back draft section H and a front draft section I. Upon leaving the front draft section I, the web W passes through a final moving condensing station J just prior to delivery of a sliver S to the coiler K. The fluid condensing station J condenses the sliver S to a predetermined size and conveys the same so that tension control of the sliver is not critical and the coiler K may be either a high coiler or a low coiler.

In more detail and referring to FIG. 4, the cutter means 24 and 26 cut the continuous filaments of the webs 10 and 12 into staples of uniform length and by arranging the webs 10 and 12 in a contiguous position with the oblique parallel cuts of one web extending transversely to the oblique parallel cuts of the other web, the two webs travel as a single web W through the condensing zone A with the fibers randomly shingled. At the back draft section C of the first gill station B the staple fibers of the web W are debonded, straightened or combined, and randomly arranged. They are further debonded and randomly shingled at the front drafting section E just prior to the web being condensed widthwise in the second condensing section F. The web enters the back draft section H of the second gill station G with many of the clusters and turn backs of staple fibers being removed. However, the second gill station G, which operates at a higher rate of speed than the first gill station, further debonds, drafts and combs the web to provide a very homogeneous sliver S which is conveyed by the condensing station J to the coiler K. Station J provides a compacting of the sliver to a round configuration of predetermined size, giving it adequate strength to hold together in the length necessary to feed either to a high coiler or a low coiler.

Figure 2:
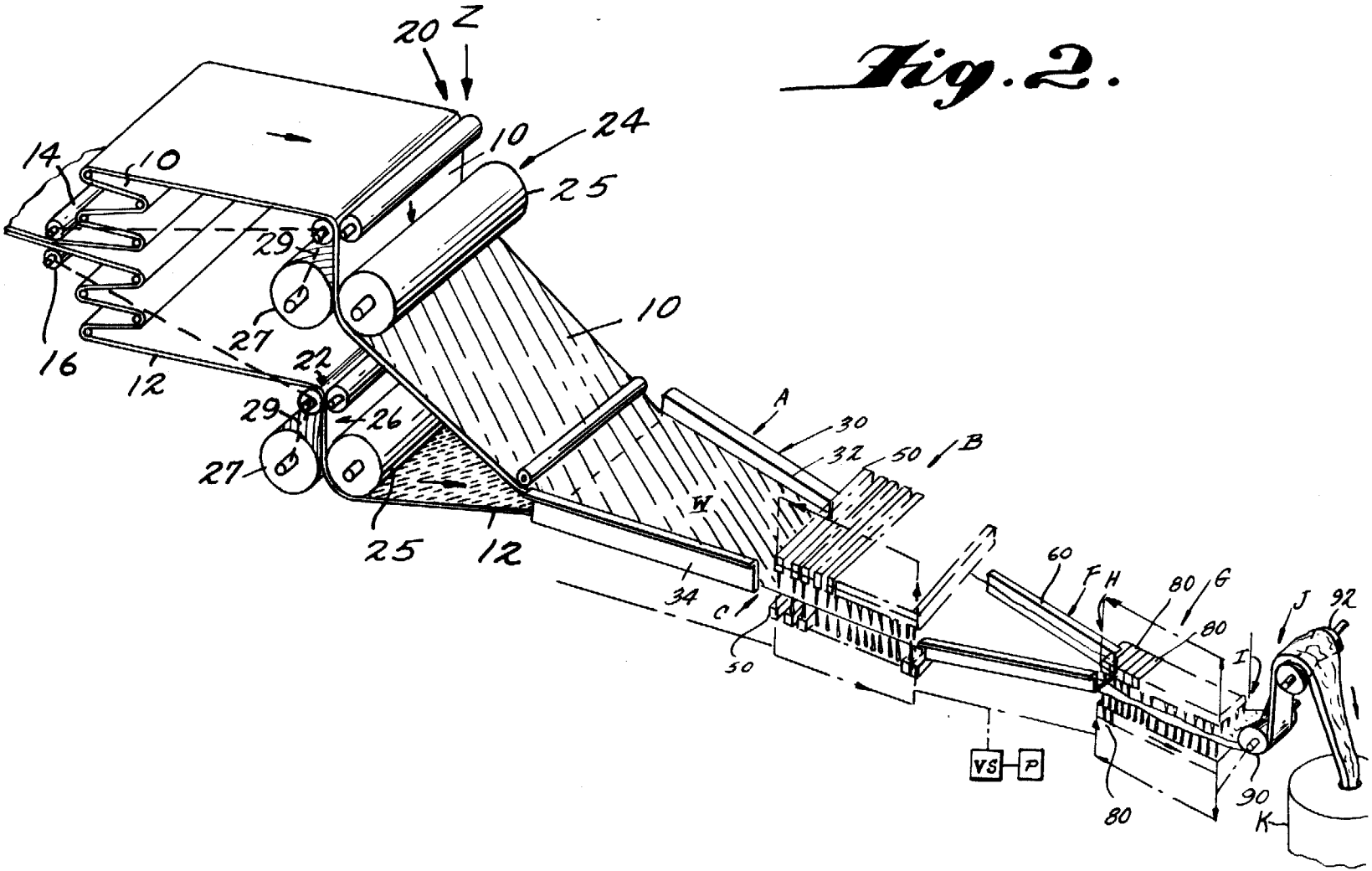
FIG. 2 is an enlarged diagrammatic perspective view of the system of FIG. 1 with portions of the system being eliminated for purposes of clarity.

As mentioned above, the creel draw rolls 14 and 16 are driven in time relation to the feed-in roll members 20 and 22. Likewise, the cutter means 24 and 26 as well as the various other elements of the first gill station B, the second gill station G and the condensing station J are all driven in time relationship to one another through suitable interconnected drive linkage preferably from a single source of power. In FIG. 2 of the drawings, the dot-dash lines between the various elements represent schematically the drive from a variable speed drive represented diagrammatically at VS. By utlizing a variable speed drive from a suitable source of power P, the system can run from zero r.p.m. to maximum speed. This feature greatly aids in creeling up the system and gives the system the ability to run at an optimum speed for the type stock in process. Some fibers have a tendency for high static propensity at one speed and not at a slightly lower speed. But utilizing a variable speed drive, this does not become critical in the system of the present invention as the drive can be set at an optimum speed for a particular fiber. Also, the system can be started at very slow speeds causing less strain on the individual units of the system as well as upon the tow being creeled through the system.

Referring to FIG. 2, it will be noted that the cutter means 24 and 26 each include a metal anvil roll 25 having a hard smooth surface and a cutter roll 27 provided with one or more steel helical lands 29 thereon. The helical lands 29 on the upper roll are counter to those on the lower roll so that when the web 10 is debonded its cut lines will extend in an opposite direction from the cut lines of the web 12 debonded by the lower roll. Thus, as shown in FIG. 4, when the two webs 10 and 12 are superimposed upon one another in contiguous relationship to each other and become the single web W, the upper web 10 has its cut lines superimposed over the cut lines of the lower web 12 thus appearing as a diamond-shaped cutting pattern in plan profile. Of course, the direction of the helices on the respective rolls 27 may be reversed or the positioning of the cutter rolls may be one or both exchanged with their respective anvil rolls so long as the helices of the cutter rolls are arranged to provide parallel cut lines in each of the webs arranged transverse to that of the other web.

Figures 1, 3:
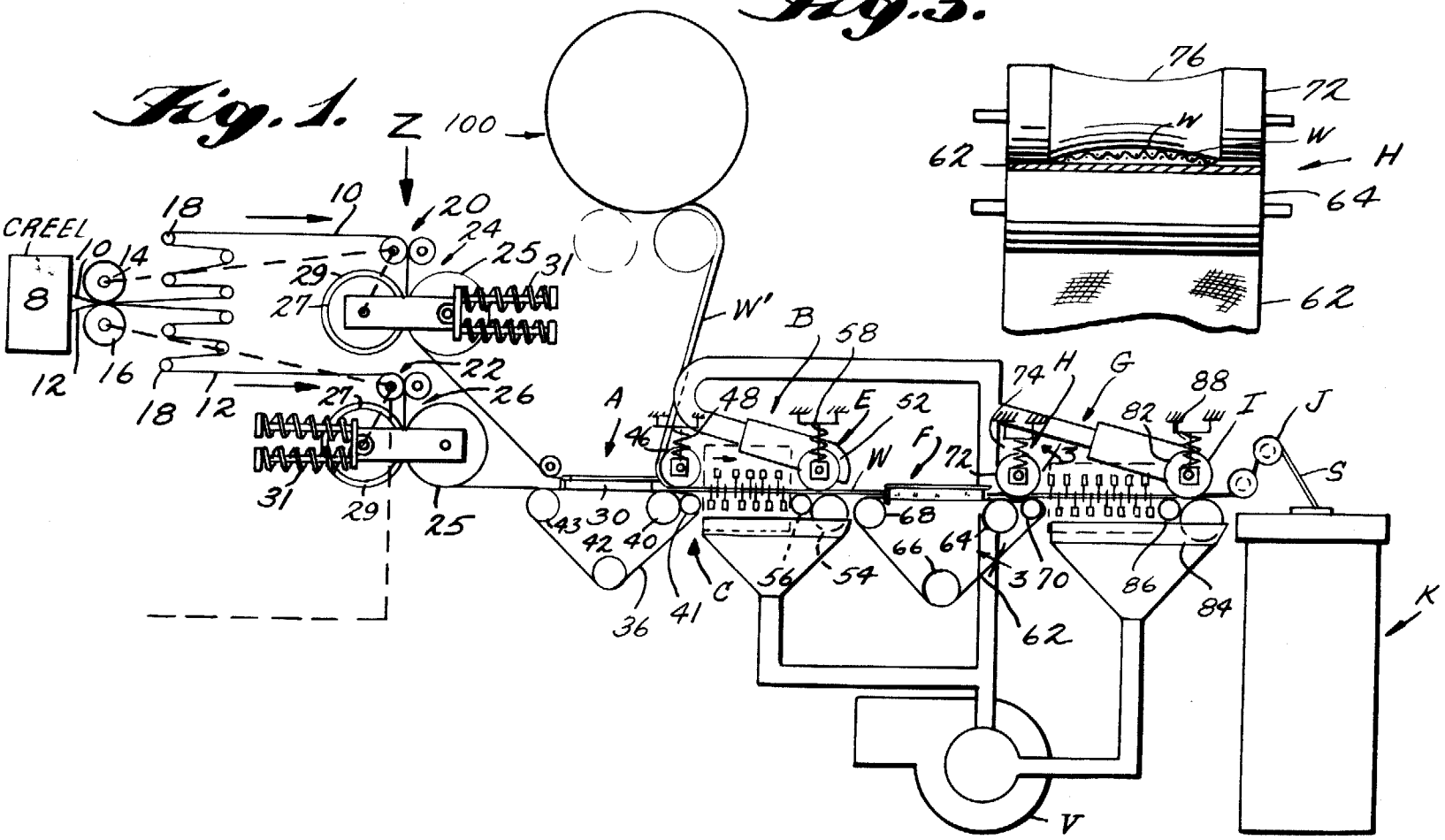
FIG. 1 is a diagrammatic side elevational view of the system of the present invention for practicing the process thereof.
FIG. 3 is a view taken substantially one the line 3—3 of FIG. 1 and illustrating the configuration of the back draft roll for the second gill station.

As shown in FIG. 1, the anvil rolls 25 and the cutter rolls 27 are spring urged toward one another by spring means 31. The springs may be adjusted to apply suitable pressure on the helices 29 against the surface of the anvil rolls (normally in the order of 4,500 to 5,500 pounds) to debond or cut a particular fiber.

The helical land or lands 29 of the cutter roll 27 of one cutter means 24, 26 is preferably arranged to cut uniform length staple fibers which are the same length as the uniform length staple fibers cut by the cutter roll 27 of the other cutter means 24, 26. However, if it is desirable to have the tow of web 10 cut into uniform length staple fibers which are different from the uniform length of staple fibers cut from the tow of web 12, then the pitch of the land or lands of one cutter roll 27 may be different from the pitch of the land or lands of the other cutter roll as shown in FIG. 5.

The stationary condensing station A includes a metal slide pan 30 having walls 32 and 34 converging in the direction of movement of the web W sliding therethrough. As shown in FIG. 1 an endless conveyor apron 36 extending about the rolls 40, 41, 42 and 43 extends under the slide pan 30 but provides a feed-in of the web W into the pan, the roll 40 cooperating with a pressure roll 46 spring urged by spring means 48 onto the conveyor apron. The pressure roll 46 and the apron define a nip area from which the web W is fed into the gill station B.

The gill station B includes the usual upper and lower faller bars 50 having opposed pins for extending into the web W and then being drawn through the web W as the web is advanced therethrough. The faller bars enter the web W at a distance from the nip of the roll 46 and apron 36 which is less than the length of a cut staple fiber so that a debonding action can occur at this back draft station C. Of course, the surface speed of the faller bars in a direction from the left to the right as viewed in either FIGS. 1 and 2 is faster than the surface speed of the roll 46 and the apron 36 and, consequently, any fibers which have not previously been debonded will be snapped at this point. Additionally, by controlling the distance between the entrance of the faller bars into the web W and the nip of the back draft station so that it is less than the length of the staple fiber cut from the continuous filament, a further shingling and drafting of the fibers in the web occurs providing a homogeneous arrangement of shingling of fibers. The movement of the faller bars in the web W between the back draft station C and the front draft station E provides a combing action for the fibers straightening out any turn backs and removing any clusters.

The front draft station E reverses the action of the faller bars 50 of the gill station B. It will be noted that the front draft station E includes an upper pressure roll 52 and a lower fluted drafting roll 54 cooperating with a second fluted drafting roll 56, the rolls having a faster surface speed than the speed of the faller bars 50. The pressure roller 52 is spring urged downwardly by spring means 58. The distance here again between the nip of the rolls of the front draft section E and the point where the faller bars 50 are moved out of the web is shorter than the length of the cut fiber. Since the surface speeds of the rolls 52, 64, and 56 is faster than the surface speed through which the faller bars 50 travel through the web, the faller bars 50 now act as a comb in reverse straightening out the back end of fibers having curlups and further assisting in the aligning or straightening of fibers. Also, there is a further drafting of the fibers and a further debonding of cut segments as there is a pul on the fibers when their leading end enters the nip between the pressure roll 52 and the fluted drafting roll 54.

The second condensing station F is substantially similar to the condensing station A except that the stationary slide pan 60 has an inlet in width no greater than the outlet of the slide pan 30 and equal to the width of the gill station B. Of course, the outlet of the slide pan 60 is reduced to the width of the second gilling station G thus further condensing the web W.

Gilling station G has its back draft station H formed as part of a second endless apron 62 extending about rolls 64, 66, 68 and 70. The apron also extends beneath the slide pan F and thus is not in contact with the web W when the web is in the slide pan although it acts as a conveyor for conveying the web into and from the slide pan. Roll 64 cooperates with a pressure roll 72 which is spring urged downwardly by spring means 74, the rolls 72 and 64 with the apron 62 traveling on the latter define a nip area for the back draft station H of the second gill station G. It will be noted in FIG. 3 that the roll 72 has a concave surface 76 and by providing such a concave surface, the web which has feathered edges due to the previous treatment on the same enters between the nip and an equal amount of pressure is distributed across the width of the sliver and hence an equal draft is obtained. The feathered edges cannot pull out in clusters without being drafted. It is not necessary to provide the roll 46 of the back draft section of the first gill station with a concave surface as the web W is more uniform across its entire width when it passes the nip of the back draft station C.

The second gill station G is similar to the first gill station B in that it is provided with upper and lower faller bars 80 having the usual pins thereon. Of course, the gill station G is smaller than the gill station B as the web 10 has been condensed in width. Additionally, the faller bars 80 move at a faster linear speed than the speed of the web passing through the nip of the back draft station H. However, the critical relationship between the point where the faller bars 80 enter the web and the nip of the back draft station H is still maintained in that the distance is shorter than the length of a cut staple fiber so that the same sort of debonding and shingling action can occur along with the straightening and combing of the fibers.

The front draft section I of the gill station G is provided with a pressure roll 82 and a fluted steel roll 84 as well as a second fluted steel roll 86. Spring means 88 urge the pressure roll 82 into contact with the rolls 84 and 86 and since the rolls 82, 84, and 86 have a surface speed faster than the surface speed of the faller bars 80 through the web W from left to right in FIGS. 2 and 3, a final debonding as well as the straightening of the ends of the fibers ocurs.

From the front draft section I the sliver S passes under a first wedge-shaped roll 90 and over a second wedge-shaped roll 92. By making the rolls 90 and 92 wedge-shaped, the sliver is condensed to a final predetermined size and held in a round configuration giving it adequate strength to hold it together in the length necessary to feed it into the coiler K. Note that the lower roll 90 with the sliver going underneath the same presses on the top of the sliver while the bottom roll presses on the bottom of the sliver and this consequently adds strength to the sliver in its conveyance to the coiler K.

As mentioned earlier, it is critical that the back draft of the gill station B be considerably higher than the front draft of that station. It has been found that the back draft for Dacron should be in the neighborhood of a 10 draft whereas the front draft should be in the neighborhood of a 1.2 draft. On the other hand, the second gill station G, which operates at a higher linear speed than the gill station B, has a back draft of 1.6 and a front draft of 4. Of course, the drafts mentioned above are purely for the purpose of example and can be changed for different types of fibers although the general relationship of drafts for each gill station remains the same.

As shown in FIG. 1, a blending attachment generally designated at 100 may be used, the blending attachment feeding wool fibers W′ in sliver form behind the back draft station for the first gill station B. Of course, the wool fibers could be fed behind the roller 72 for the second gill station G if so desired.

During the cutting of the tow a certain amount of waste occurs at cutting due to the mashing of the fibers. This waste, which is sometimes called "fish food" is drawn from above and below the web at both the first gill station B and the second gill station G. In more detail, a source of vacuum V is provided, the source of vacuum being connected by suitable conduits to a suction head over cot roll 52, a second suction head over the cot roll 84, and a third suction head beneath the faller bars 50 and a fourth suction head beneath the faller bars 80. Because of the agitation of the fibers by the faller bars, the "fish food" is stirred up and very easily drawn off from the web at these points leaving the resulting sliver relatively free of any waste thus producing a high quality sliver for use in making yarn.

The objects and advantages of the present invention have been fully and effectively accomplished by the system and process described above and illustrated in the drawings. It will be realized that various changes may be made to the specific embodiment shown and described without departing from the principles of the invention.

Therefore, the terminology used throughout the specification is for the purpose of description and not limitation, the scope of the invention being defined in the claims.

What is claimed is:

1. A system for converting a continous filament tow into a homogeneous sliver or the like having uniform staple fiber length throughout comprising:

(1) first and second means for feeding at least two webs of continuous filament tow from a source of supply;

(2) a pair of cutter means for respectively cutting the filaments of the webs into staple fibers of uniform length and super-imposing the webs on one another;

(3) an in-line apparatus for debonding, drafting, and combing the webs of staple fibers into the homogeneous sliver; said in-line apparatus including (a) a first slide pan for receiving the superimposed webs, said slide pan condensing the width of said webs, (b) back draft means at the discharge end of first slide pan defining a nip through which the webs are conveyed at a predetermined linear speed, (c) a gill station having faller bar means moving in the direction of movement of the webs, said faller bar means first engaging the web at a distance from said nip of said back draft means shorter than the length of the cut staple fibers and said faller bar means moving away from the nip at a faster linear speed than the linear speed of the web passing through said nip, (d) a pair of front draft rolls at the discharge end of said gill station defining a nip therebetween through which the webs travel at a predetermined linear speed faster than the linear speed of the webs through said gill station, (e) a second slide pan for receiving webs from said front draft rolls and further condensing the width of the webs, (f) a second back draft means at the discharge end of said second slide pan defining a nip through which the webs are conveyed at a predetermined linear speed, said second back draft means comprising a moving apron and a cooperating pressure back draft roll defining the nip, said pressure back draft roll having a concave surface whereby an equal amount of pressure is distributed across the width of the sliver and pullout of clusters of fibers in feathered edges of the sliver is eliminated, (g) a second gill station having faller bar means and arranged to receive the webs as they discharge from said last-mentioned back draft means, said faller bar means of said second gill station being arranged to engage the web at a distance from the nip of said last-mentioned back draft means less than the length of the cut staple fibers, (h) a second pair of front draft rolls at the discharge end of said second gill station defining a nip therebetween through which the webs travel at a predetermined linear speed faster than the linear speed of the webs through said second gill station, (i) and conveying means for receiving the web from said second pair of front draft rolls and further condensing the sliver prior to coiling.

2. A system as claimed in claim 1 in which said first back draft means includes an apron moving in the direction of feed of the webs and a pressure back draft roll cooperating with the apron and defining the nip of the said first back draft means.

3. A system as claimed in claim 1 in which said conveying means at the discharge end of said second pair of front rolls include at least one roller having wedge-shaped surface configuratoin for condensing the sliver prior to coiling.

4. A system as claimed in claim 3 including a second roller having a wedge-shaped configuration, said second roller being positioned at a higher elevation than said first wedge-shaped roller and rotating at a faster rate than the linear speed of the sliver.

5. A system as claimed in claim 2 in which said first-mentioned back draft means comprises a moving apron and a cooperating pressure back draft roll defining the nip, said pressure back draft roll being substantially cylindrical.

6. A system as claimed in claim 1 in which said first and second means for feeding at least two webs of continuous filament two operatively feeds the webs to said pair of cutter means and in which each of said first and second feeding means includes at least one creel draw-in roll, creel tension rolls about which the webs are threaded and a pair of feed-in rolls for feeding the respective web to one of said pair of cutter means, said creel draw-in roll and said feed-in rolls being driven relative to one another whereby a predetermined tension is placed on the webs of tow threaded around said tenison rolls.

7. A system as claimed in claim 1 in which said pair of cutter means includes a first cutter roll having at least one helical cutter element thereon and an anvil roll cooperating with said cutter roll for receiving and cutting the filaments of one of said webs obliquely and a second cutter roll having at least one helical cutter element thereon and an anvil roll cooperating therewith for receiving and cutting the filaments of other of said webs obliquely, said first and second cutter rolls being positioned on parallel axes and having their respective helical cutter elements arranged relative to one another to cut the respective webs on obliques which are opposite one another when the webs are superimposed on each other so as to result in a diamond-shaped cutting pattern in plan elevation.

8. A system as claimed in claim 1 including suction means for cleaning cutter waste, said suction means comprising a suction head beneath each of said gill stations and a suction head above each of the top front draft rolls.

9. A system as claimed in claim 1 including means for blending a web of staple fibers just forward of the back drafting means of said first gill station, said means including feed rolls for feeding sliver of staple fibers to the back draft means.

10. An apparatus for converting and arranging at least two webs of continuous filament tow into staple fibers of uniform length, the webs being superimposed to define a single web of staple fibers having homogeneous shingling, the apparatus comprising:

(1) a first feeding means for moving a first web of continuous filament tow at a predetermined rate;

(2) a second feeding means for moving a second web of continuous filament tow at a predetermined rate;

(3) a first cutter means comprising a rotatable smooth anvil roll and a rotatable cutter roll having at least one helical cutter element thereon to form a nip with the anvil roll for fracturing filaments of said first web along parallel lines extending obliquely to the direction of feed of the first web therebetween;

(4) a second cutter means comprising a second rotatable smooth anvil roll and a second rotatable cutter roll having at least one helical cutter element thereon to form a nip with the anvil roll for fracturing the filaments of said second web along parallel lines extending obliquely to the direction of feed, said second cutter roll and said second anvil roll being mounted on axes parallel to the axes of said first cutter roll and said first anvil roll with the said at least one helical cutter element on said second cutter roll being oriented to provide parallel fracture lines in said second web transverse to said parallel fracture lines of said first web wherein when the first and second webs passing respectively from the first and second cutter means are superimposed on each other to define the single web, the single web has a diamond-shaped cutting pattern in plan elevation.

11. An apparatus as claimed in claim 10 in which the helical cutter element of said first cutter roll is right handed and in which said helical cutter element of said second cutter roll is left handed.

12. An apparatus as claimed in claim 10 in which said first cutter roll includes a plurality of said helical cutter elements spaced an equal distance from each other and wherein said second cutter roll has a plurality of cutter elements spaced an equal distance from each other, the distance being equal to the distance between the helical cutter elements of said first cutter roll whereby the uniform length of fibers cut in said first and second webs are equal in length to one another.

13. A system for converting a continuous filament tow into a homogeneous sliver or the like having uniform staple fiber length throughout comprising:

(1) a first and second means for feeding at least two webs of continuous filament tow from a source of supply;

(2) a pair of cutter means for respectively cutting the filaments of the webs into stape fibers of uniform length and superimposing the webs on one another;

(3) an in-line apparatus for debonding, drafting, and combining the webs of staple fibers into the homogeneous sliver; said in-line apparatus including (a) a first slide pan for receiving the superimposed webs, said slide pan condensing the width of said webs, (b) back draft means at the discharge end of first slide pan defining a nip through which the webs are conveyed at a predetermined linear speed, (c) a gill station having faller bar means moving in the direction of movement of the webs, said faller bar means first engaging the web at a distance from said nip of said back draft means shorter than the length of the cut staple fibers and said faller bar means moving away from the nip at a faster linear speed than the linear speed of the web passing through said nip, (d) a pair of front draft rolls at the discharge end of said gill station defining a nip therebetween through which the webs travel at a predetermined linear speed faster than the linear speed of the webs through said gill station, (e) a second slide pan for receiving webs from said front draft rolls and further condensing the width of the webs, (f) a second back draft means at the discharge end of said second slide pan defining a nip through which the webs are conveyed at a predetermined linear speed, (g) a second gill station having faller bar means and arranged to receive the webs as they discharge from said last-mentioned back draft means, said faller bar means of said second gill station being arranged to engage the web at a distance from the nip of said last-mentioned back draft means less than the length of the cut staple fibers, (h) a second pair of front draft rolls at the discharge end of said second gill station defining a nip therebetween through which the webs are conveyed at a predetermined linear speed, (i) and conveying means for receiving the web from said second pair of front draft rolls and further condensing the sliver prior to coiling, said conveying means including a first roller having a wedge-shaped surface configuration and a second roller having a wedge-shaped configuration, said second roller being positioned at a higher elevation than said first roller and cooperating therewith, said second roller rotating at a faster rate than the linear speed of the sliver.

14. An apparatus for converting and arranging at least two webs of continuous filaments tow into staple fibers of uniform length, the webs being superimposed to define a single web of staple fibers having homogeneous shingling, the apparatus comprising:

(1) a first feeding means for moving a first web of continuous filament tow at a predetermined rate;

(2) a second feeding means for moving a second web of continuous filament tow at a predetermined rate;

(3) a first cutter means comprising a rotatable smooth anvil roll and a rotatable cutter roll having a plurality of helical cutter elements thereon to form nips with the anvil roll for fracturing filaments of said first web along parallel lines extending obliquely to the direction of feed of the first web therebetween, said helical cutter elements being spaced apart an equal distance from each other to cut uniform lengths of staple fibers from said web;

(4) a second cutter means comprising a second rotatable smooth anvil roll and a second rotatable cutter roll having a plurality of helical cutter elements thereon to form nips with the anvil roll for fracturing the filaments of said second web along parallel lines extending obliquely to the direction of feed, said helical cutter elements being spaced apart an equal distance from each other but different from the said distance between the helical cutter elements of said first cutter roll whereby the uniform length of staple fibers cut by said second cutter roll is different in length from the uniform length of staple fibers cut by said first cutter roll, said second cutter roll and said second anvil roll being mounted on axes parallel to the axes of said first cutter roll and said first anvil roll with the said plurality of helical cutter elements on said second cutter roll being oriented to provide parallel fracture lines in said second web transverse to said parallel fracture lines of said first web wherein when the first and second webs passing respectively from the first and second cutter means are superimposed on each other to define the single web, the single web has a diamond-shaped cutting pattern in plan elevation.

(References on following page)

References Cited

The following reference, cited by the Examiner, are of record in the patented file of this patent or the original patent.

UNITED STATES PATENTS

| | | | |
|---|---|---|---|
| 1,114,293 | 10/1914 | Rothe | 19—150 |
| 2,145,144 | 1/1939 | Youngman | 19—.51 X |
| 2,232,299 | 2/1941 | Zetzsche et al. | 19—.51 |
| 2,234,330 | 3/1941 | Zetzsche et al. | 19—.51 |
| 2,323,300 | 7/1943 | Abbott | 19—.51 X |
| 2,621,376 | 12/1952 | Cottam et al. | 19—157 |
| 2,719,333 | 10/1955 | Buchanan | 19—263 X |

| | | | |
|---|---|---|---|
| 2,820,254 | 1/1958 | Ingenthron | 19—.51 X |
| 2,908,043 | 10/1959 | Whitney | 19—.56 X |
| 3,104,426 | 9/1963 | Wellman | 19—129 R |
| 3,209,410 | 10/1965 | New et al. | 19—51 |

FOREIGN PATENTS

| | | | |
|---|---|---|---|
| 825,754 | 12/1959 | Great Britain | 19—129 R |
| 1,076,172 | 7/1967 | Great Britain | 19—129 R |

DORSEY NEWTON, Primary Examiner

U.S. Cl. X.R.

19—129 R

UNITED STATES PATENT OFFICE
CERTIFICATE OF CORRECTION

Patent No. Re. 27,764 Dated Oct. 2, 1973

Inventor(s) Elbert F. Morrison and Raymond D. Joy

It is certified that error appears in the above-identified patent and that said Letters Patent are hereby corrected as shown below:

Col. 1, line 6, after "N.C. 27025" insert

--Assignors to Burlington Industries, Inc.

Greensboro, N.C., a corporation of Delaware--

Signed and sealed this 16th day of April 1974.

(SEAL)
Attest:

EDWARD M.FLETCHER,JR.
Attesting Officer

C. MARSHALL DANN
Commissioner of Patents